(12) United States Patent
Tsuboi et al.

(10) Patent No.: US 8,179,544 B2
(45) Date of Patent: May 15, 2012

(54) IMAGE PROCESSING SYSTEM, IMAGE PROCESSOR AND IMAGE PROCESSING PROGRAM

(75) Inventors: Tomo Tsuboi, Chiyoda-ku (JP); Kazuo Maatoba, Chiyoda-ku (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1020 days.

(21) Appl. No.: 11/019,248

(22) Filed: Dec. 23, 2004

(65) Prior Publication Data

US 2006/0098224 A1    May 11, 2006

(30) Foreign Application Priority Data

Nov. 9, 2004 (JP) .................................. 2004-325215

(51) Int. Cl.
*G06F 3/12* (2006.01)

(52) U.S. Cl. ...................... 358/1.15; 358/1.13; 709/203

(58) Field of Classification Search .......... 358/1.13–1.16
See application file for complete search history.

(56) References Cited

U.S. PATENT DOCUMENTS

| | | | | |
|---|---|---|---|---|
| 5,727,135 | A * | 3/1998 | Webb et al. .................. 358/1.14 |
| 5,956,158 | A * | 9/1999 | Pinzarrone et al. ............ 358/474 |
| 6,081,817 | A | 6/2000 | Taguchi |
| 6,405,318 | B1 * | 6/2002 | Rowland ......................... 726/22 |
| 6,571,293 | B1 | 5/2003 | Hong |
| 6,592,629 | B1 | 7/2003 | Cullen et al. |
| 6,604,157 | B1 | 8/2003 | Brusky et al. |
| 6,642,943 | B1 * | 11/2003 | Machida ........................ 715/763 |
| 6,704,118 | B1 | 3/2004 | Hull et al. |
| 6,813,037 | B1 * | 11/2004 | Collard ......................... 358/1.15 |
| 7,080,040 | B2 * | 7/2006 | Akiyama ......................... 705/51 |
| 7,215,437 | B2 * | 5/2007 | Shima .......................... 358/1.15 |
| 7,243,126 | B2 * | 7/2007 | Sasaki et al. ................. 709/206 |
| 2003/0048470 | A1* | 3/2003 | Garcia ......................... 358/1.15 |
| 2003/0084085 | A1* | 5/2003 | Breidenbach et al. ............ 709/1 |
| 2003/0105849 | A1* | 6/2003 | Iwamoto et al. .............. 709/223 |

FOREIGN PATENT DOCUMENTS

| | | |
|---|---|---|
| JP | 2000-316065 A | 11/2000 |
| JP | 2001-148753 A | 5/2001 |
| JP | 2002-077504 A | 3/2002 |
| JP | 2003-032423 A | 1/2003 |
| JP | 2003-046700 A | 2/2003 |
| JP | 2003-324574 A | 11/2003 |
| JP | 2004-088613 A | 3/2004 |
| JP | 2004-110842 A | 4/2004 |

* cited by examiner

*Primary Examiner* — Chan Park
(74) *Attorney, Agent, or Firm* — Morrison & Foerster LLP

(57) ABSTRACT

To provide a system in which image data created in an image processor is processed in association with an application activated on a user terminal. The system includes an image processor, and a user terminal connected with the image processor over a network. The image processor includes: an activated application identifying unit for obtaining information about an application activated on the user terminal; a one-touch key generating unit for generating a one-touch key including information for processing image data by the application activated on the user terminal; and a transmission unit for transmitting the image data to the user terminal. The user terminal includes: a receiving unit for receiving the image data from the image processor; and a one-touch key processing unit for processing the image data by the application activated on the user terminal, based on the information of the one-touch key.

14 Claims, 8 Drawing Sheets

Fig.6

```
USER NAME: _____

PASSWORD [        ]
           0 1 3 4 5 6 7 8 9
           Q W E R T Y U I O P
           A S D F G H J K L
           Z X C V B N M
```

Fig.7

READY TO SCAN AND TRANSMISSION
PLEASE SET THE DESTINATION

26 — TRANSMIT MAIL FROM USER PC
28 — PREPARE DOCUMENT ON USER PC

| Tarou | Kenji | Masako | Toshi | Akemi |
|-------|-------|--------|-------|-------|
| —     | —     | —      | —     | —     |

Fig.8

READY TO COPY

| CHARACTERS/PICTURES | ×1.00 | AUTO PAPER SELECTION |
|---|---|---|
|   |   |   |

| To : | tarou@aaa.co.jp |
|---|---|
| From : | hanako@aaa.co.jp |
| Subject : | TRANSMISSION OF PRODUCT SPECIFICATION |
| Body : | PLEASE FIND THE PRODUCT SPECIFICATION WHICH HAS BEEN TALKED ABOUT THE OTHER DAY. THANK YOU. |

IMAGE PROCESSING SYSTEM, IMAGE PROCESSOR AND IMAGE PROCESSING PROGRAM

This application claims priority from Japanese Patent Application No. 2004-325215 filed in Japan on Nov. 9, 2004, the contents of which are hereby incorporated by reference.

BACKGROUND OF THE INVENTION

1. Field of the Invention

The present invention relates to, an image processing system including an image processor and user terminals connected over a network, an image processor, and an image processing program.

2. Description of the Related Art

As an image processor, a multiple function peripherals (MFP), for example, including a scanning function for loading scanned image data as an image file in addition to a printing function, has been used recently. Each image processor is not connected with one user terminal only, but connected with a network. In such a case, one image processor is connected with a plurality of user terminals over a network, and image data scanned and loaded by the image processor is transmitted to a desired user terminal.

Examples of such a device are as follows. An image processor described in Japanese Patent Laid-open Publication No. 2003-46700 (Patent Document 1) converts image information, which has been read, into a PDF file format, and then transmits it to a personal computer designated by an operation unit. The personal computer which received the image information automatically activates the Acrobat, a software, so as to display the image information in a PDF file format on the screen. A scanner device described in Japanese Patent Laid-open Publication No. 2002-77504 (Patent Document 2) forms a scanned script as an attachment file of an e-mail. A facsimile device described in Japanese Patent Laid-open Publication No. 2003-32423 (Patent Document 3) additionally transmits e-mail text for decoding the attached file. An e-mail system described in Japanese Patent Laid-open Publication No. 2003-324574 (Patent Document 4) stores the e-mail title, text and comment corresponding to a destination in advance, and transmits scanned image data to the destination as an attachment file. In a scanned mail transmission system described in Japanese Patent Laid-open Publication No. 2004-88613 (Patent Document 5), a user prepares and registers, in advance, the e-mail destination, text and subject which are to be accessed at the time of scanning, and transmits image data as an attachment file.

However, a user must return to a user terminal after transmitting image data from an image processor to the user terminal of oneself, and process the image data on the user terminal side. For example, after receiving the image data, the user must prepares the text and the subject of an e-mail on the user terminal side, and transmit the received image data by attaching it to the e-mail, or the user must attach the received image data to a document which has been prepared.

Each of the aforementioned Patent Documents also has a problem similar to that described above as for the related art. For example, the image processor of Patent Document 1 does not obtain information for an application activated on a user terminal, but only displays it on the screen. The push-type scanner device of Patent Document 2 just transmits image data as an attachment file of an e-mail, so the subject and the text of the e-mail cannot be set. The facsimile device of Patent Document 3 only has a feature that information for decoding the attachment file is made as e-mail text, and arbitrary editing is not possible. The e-mail system of Patent Document 4 only has a feature of accessing data registered in advance. The data cannot be changed as needed. In the scanned mail transmission system of Patent Document 5, scanned mail information must be set before using the system. Further, the system only accesses the information which has been prepared before using it, and the information cannot be changed as needed.

As described above, a user, after creating image data in an image processor and transmitting it to a user terminal of oneself, must return to the user terminal and process the received image data by using an application.

SUMMARY OF THE INVENTION

It is therefore an object of the present invention to provide a system for processing image data created in an image processor by associating it with an application activated on a user terminal.

An image processing system according to the present invention comprises, an image processor, and user terminals connected with the image processor over a network. The image processor includes: an activated application identifying unit for obtaining information about an application activated on the user terminal; a one-touch key generating unit for generating a one-touch key including information for processing image data by the application activated on the user terminal; and a transmission unit for transmitting the image data to the user terminal. The user terminal includes: a receiving unit for receiving the image data from the image processor; and a one-touch key processing unit for processing the image data by the application activated on the user terminal, based on the information of the one-touch key.

According to the image processing system of the present invention, a one-touch key including information for processing image data, created in the image processor, by an application activated on a user terminal is generated, and based on the information of the one-touch key, the image data can be processed by the application activated on the user terminal. Thereby, the user can process, on the image processor side, the image data in association with the application activated on the user terminal, without returning to the user terminal.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 6 shows a login screen in the image processor;

FIG. 7 shows a screen displaying a one-touch key on the image processor;

FIG. 8 shows an ordinary display screen in the image processor;

PREFERRED EMBODIMENT OF THE INVENTION

Figure 1:
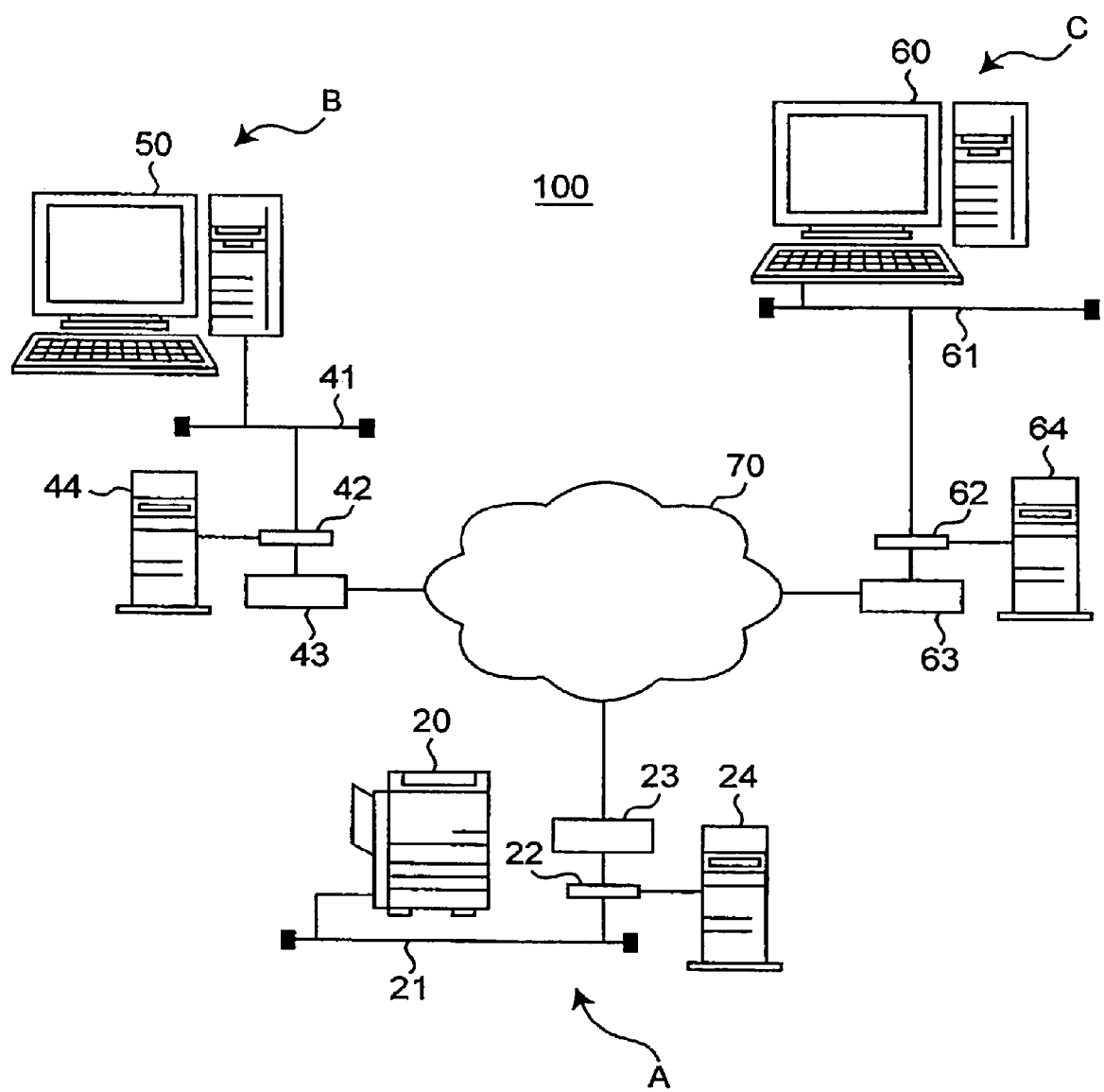
FIG. 1 is a schematic diagram showing the configuration of an image processing system according to an embodiment 1 of the present invention.

An image processing system, an image processor and an image processing program according to an embodiment of the present invention will be described by using the accompanying drawings. In the drawings, substantially same members are denoted by the same reference numerals.

Embodiment 1

FIG. 1 is a schematic diagram showing the configuration of an image processing system including an image processor according to an embodiment 1 of the present invention. The image processing system 100 includes three sites A, B and C connected with a wide area network 70 such as the Internet. A LAN 21 in the site A is connected with a firewall 23, a router 22, an image processor 20, and a mail server 24. A LAN 41 in the site B is connected with a firewall 43, a router 42, a user terminal 50, and a mail server 44. A LAN 61 in the site C is connected with a firewall 63, a router 62, a client terminal 60 which is the destination of an e-mail, and a mail server 64. The firewalls are set to allow SMTP (Simple Mail Transfer Protocol) packets, that is, e-mails, to pass through. Equipment connected with the LAN 21, 41 or 61 in each site transmits and receives e-mails via the mail server 24, 44 or 64 connected with the same LAN. In a case of attaching image data to an e-mail, the system complies with RFC2301 to RFC2306 and ITU-T Recommendation T37. The mail servers 24, 44 and 64 support an SMTP extension function (RFC1891: STMP Service Extension for Delivery Status Notifications), enhanced status codes (RFC1893: Enhanced Mail System Status Codes), and MIME media type (RFC1892: The Multipart/Report Content Type for the Reporting of Mail System Administrative Messages, RFC1894: An Extensive Message Format for Delivery Status Notifications).

Figure 2:
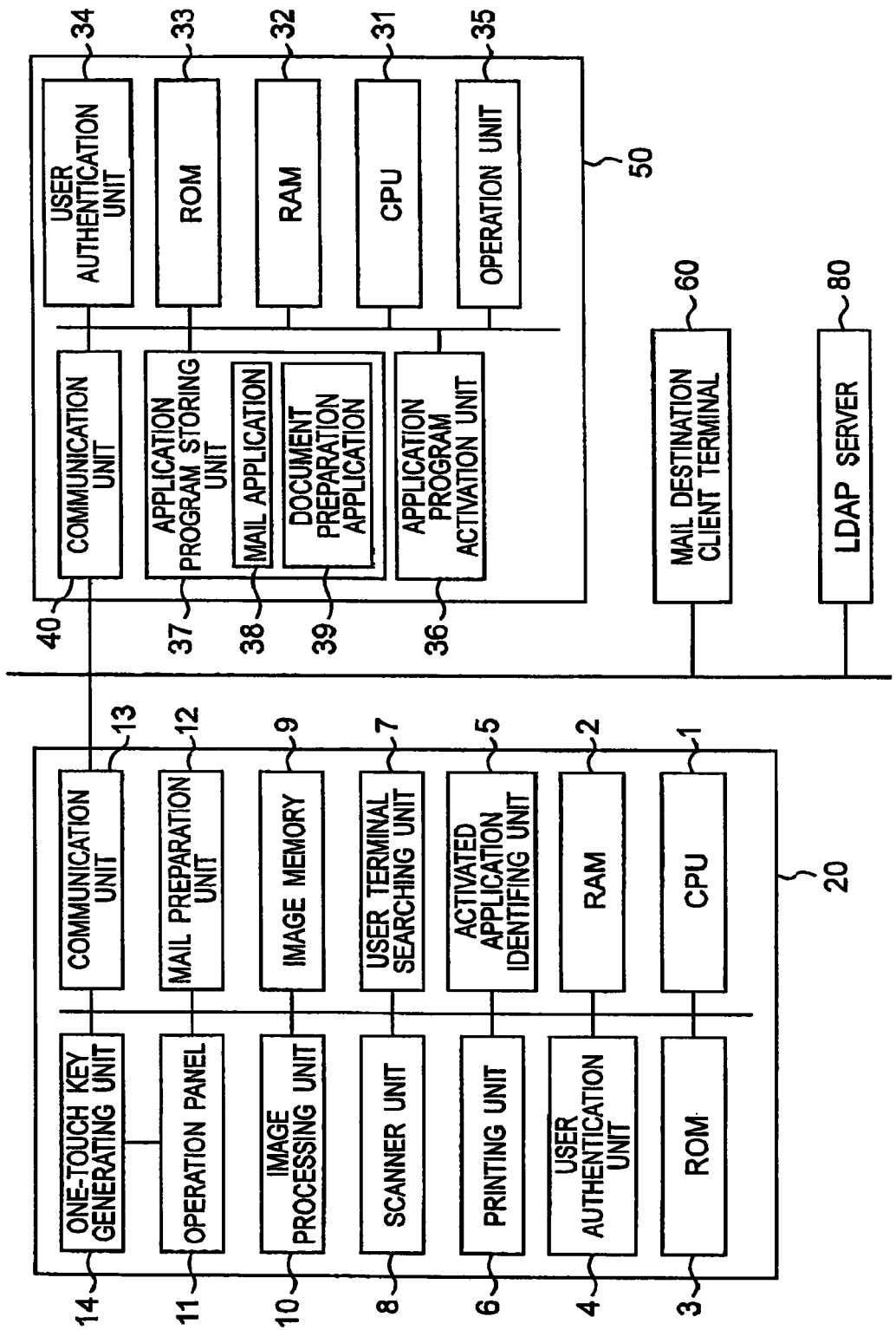
FIG. 2 is a block diagram showing the configuration of an image processor and a user terminal in FIG. 1.

FIG. 2 is a block diagram showing the configuration of the image processor 20 and the user terminal 50 in the image processing system of FIG. 1. In addition to the image processor 20, the user terminal 50 and the mail destination client 60, an LDAP server 80 is also included in FIG. 2. The image processor 20 includes, a CPU 1, a RAM 2, a ROM 3, a user authentication unit 4, an activated application identifying unit 5, a printing unit 6, a user terminal searching unit 7, a scanner unit 8, an image memory 9, an image processing unit 10, an operation panel 11, an e-mail preparing unit 12, a communication unit 13, and a one-touch key generating unit 14. The image processor 20 is connected with a network by the communication unit 13. In FIG. 2, a plurality of networks existing between one another are shown in a simplified manner. The image processor 20 generates a one-touch key for instructing to process image data transmitted from the image processor 20 by an application activated on the user terminal, as shown in FIG. 7. Based on information of the one-touch key, the image data transmitted from the image processor 20 can be processed by an application activated on the user terminal 50, by a one-touch key processing software activated on the user terminal 50. Thereby, the user can perform processing in association with the application activated on the user terminal 50 by using the one-touch key displayed on the operation panel 11 of the image processor 20, without returning to the user terminal 50.

The user terminal 50 includes a CPU 31, a RAM 32, a ROM 33, a user authentication unit 34 for performing user authentication at the time of login, an operation unit 35, an application program activating unit 36, an application program storing unit 37, and a communication unit 40. The application program storing unit 37 stores, for example, an e-mail application 38 and a document preparation application 39.

The LDAP server 80 notifies the image processor 20 of user terminal information for specifying the user terminal 50, responding to an inquiry from the image processor 20.

Figure 3:
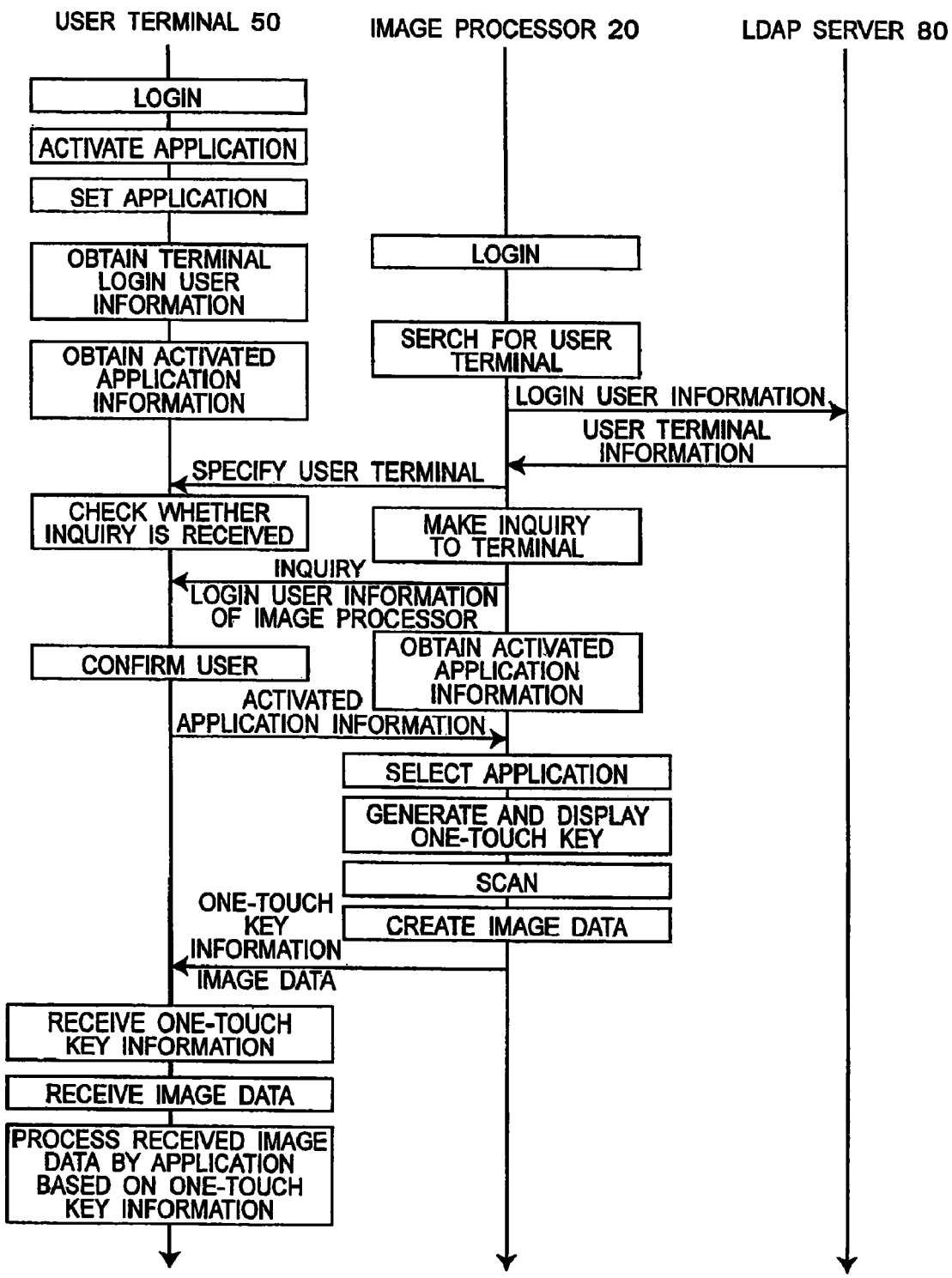
FIG. 3 is a timing chart of the image processing system according to the embodiment 1 of the present invention.
Figure 4:
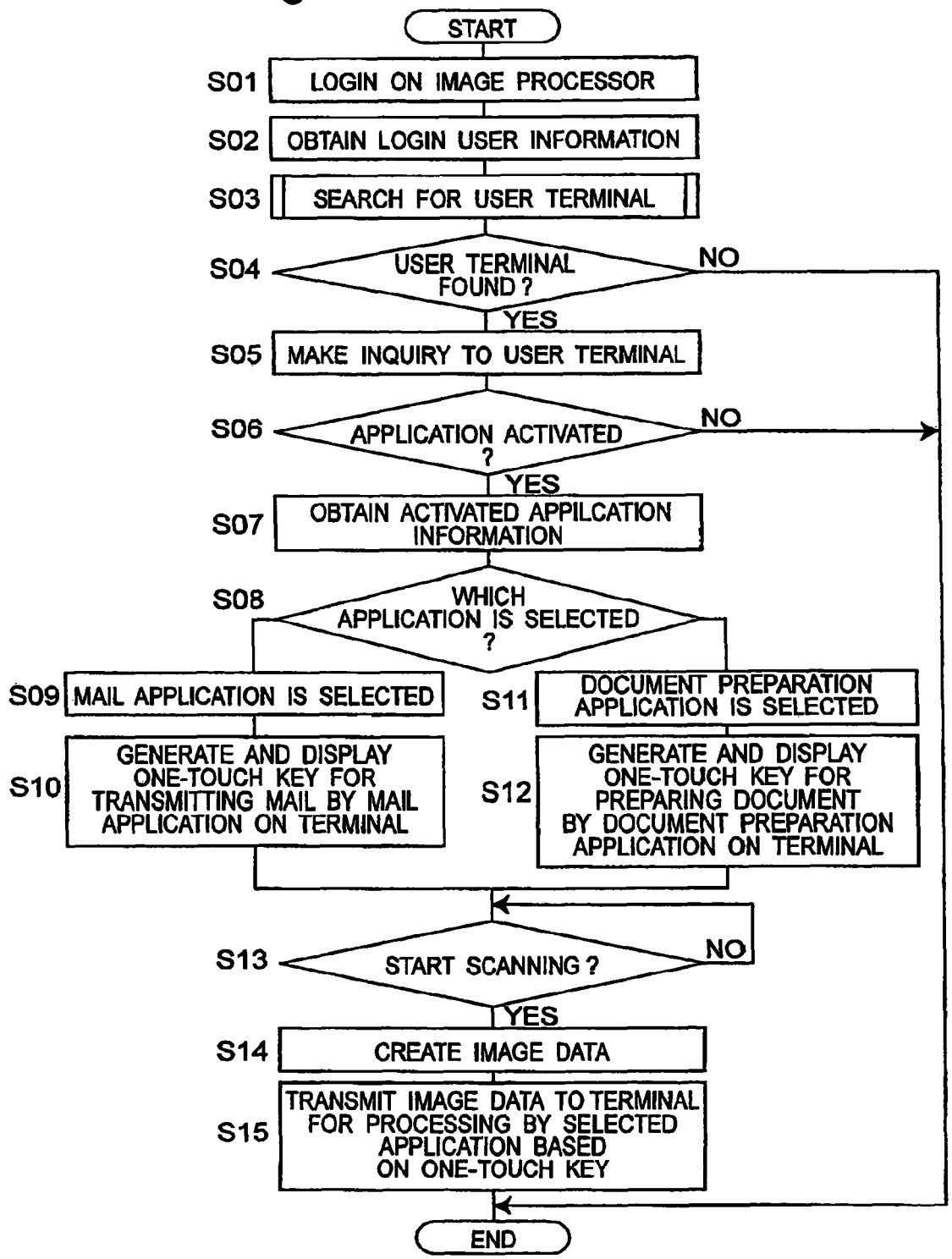
FIG. 4 is a flowchart showing an image processing method in the image processor according to the embodiment 1 of the present invention.

FIG. 3 is a time chart of the image processing system according to the embodiment 1 of the present invention. FIG. 4 is a flowchart showing an image processing method in the image processor according to the embodiment 1 of the present invention. In the image processing system, a user logs in to the user terminal 50 with an authentication by the user authentication unit 34, activates an application, and sets conditions for the application, in advance, as shown in FIG. 3.

Then, the user moves from the user terminal 50 side to the image processor 20 side, and directly operates the image processor 20. First, the user logs in to the image processor 20 with an authentication by the user authentication unit 4. The subsequent image processing method in the image processor 20 will be described by using FIG. 4.

(a) The image processor 20 displays a login screen as shown in FIG. 6 and accepts a login by the user (S01).

(b) The image processor 20 obtains information about the login user of the image processor 20 (S02).

(c) The user terminal searching unit 7 searches for a user terminal which is logged in by the same user as the login user of the image processor 20 (S03). The detailed description of step S03 will be described later in accordance with a flowchart shown in FIG. 5.

(d) The image processor 20 determines whether or not the user terminal 50, which is logged in by the same user as the login user of the image processor 20, exists (S04).

(e) An inquiry is made to the specified user terminal 50 (S05).

(f) The image processor 20 determines whether or not an application is activated on the user terminal 50 (S06). Specifically, the activated application identifying unit 5 obtains activated application information from the user terminal 50 (S07).

(g) The activated application identifying unit 5 obtains information about an application activated on the user terminal 50 (S07).

(h) The image processor 20 accepts a selection of application by the user (S08).

i) If the user selected an e-mail application 38 (S09), the one-touch key generating unit 14 generates a one-touch key 26 for transmitting an e-mail, to which image data is attached, by the e-mail application 38 on the user terminal 50, and displays it (S10), as shown in FIG. 7.

ii) If the user selected a document preparation application 39 (S11), the one-touch key generating unit 14 generates a one-touch key 28 for preparing a document including image data by the document preparation application 39 on the user terminal 50, and displays it (S12), as shown in FIG. 7.

If a one-touch key cannot be generated or displayed, a screen shown in FIG. 8, for example, will be displayed.

(k) The image processor 20 confirms whether to start scanning (S13).

(l) Image data is created through scanning performed by the scanner unit 8 (S14).

(m) In accordance with the one-touch key, the image data is transmitted to the user terminal 50 so as to be processed by the selected application (S15).

With these steps, the image data created in the image processor 20 can be processed by the application activated on the user terminal 50.

Figure 5:
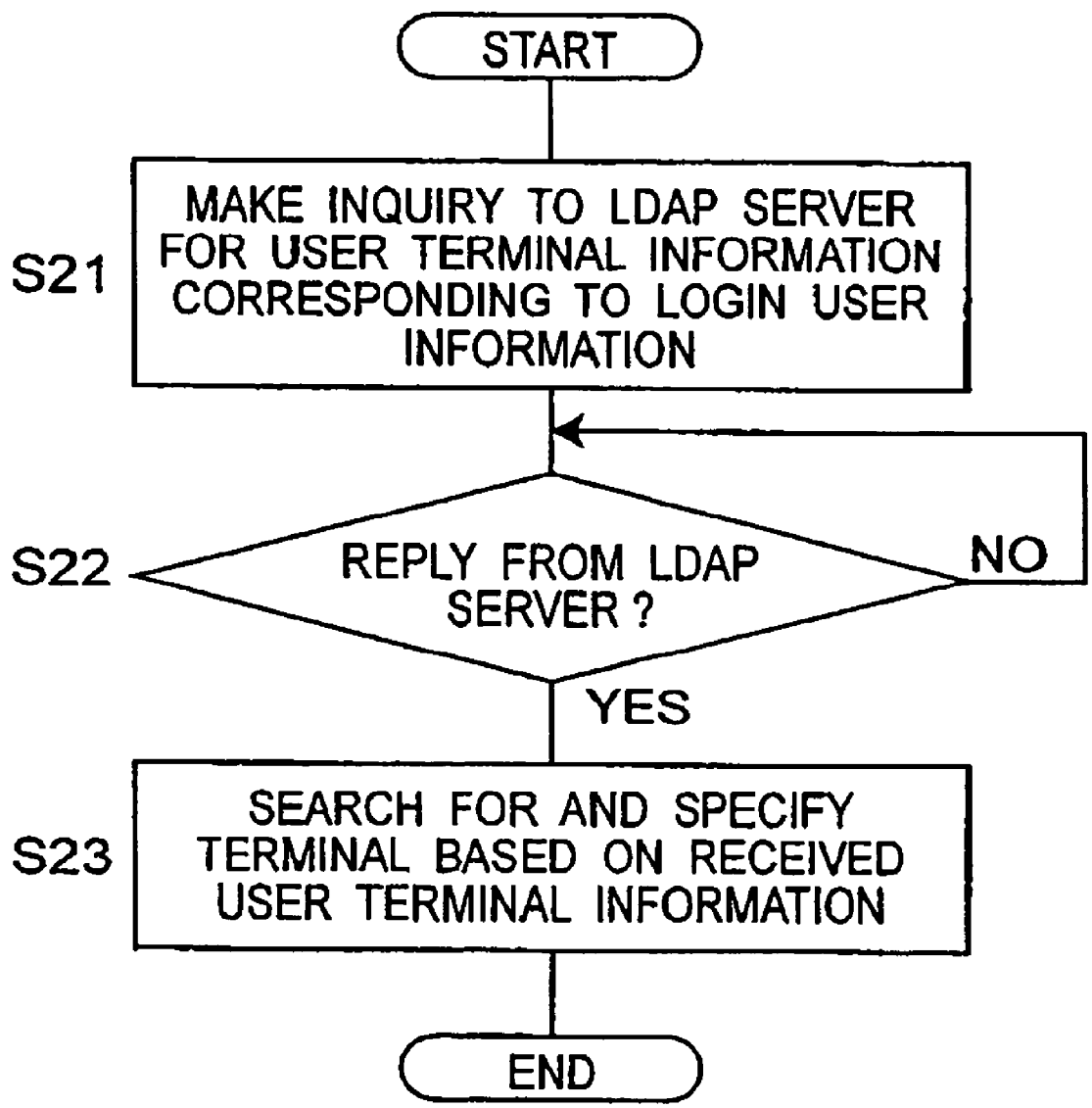
FIG. 5 is a flowchart showing the details of step S03 of FIG. 4.

FIG. 5 is a flowchart showing the details of the step S03 of searching the user terminal by the user terminal searching unit 7 in FIG. 4.

(a) The user terminal searching unit 7 transmits information about a user logged in to the image processor 20 to the LDAP server 80 so as to make an inquiry to the LDAP server 80 for information about the user terminal 50 which is logged in by the same user (S21).

(b) The user terminal searching unit 7 determines whether or not the LDAP server 80 replied (S22). If the LDAP server 80 replied, the user terminal searching unit 7 moves to step S23, but if the LDAP server did not reply, repeats step S22.

(c) The user terminal searching unit 7 searches for the user terminal 50 based on the received information about the user terminal 50, and specifies it (S23).

With these steps, the user terminal 50 which is logged in by the same user as the login user of the image processor 20 can be specified.

In this way, it is possible to process, on the image processor 20 side, the created image data in association with the activated application on the user terminal 50 in accordance with information of the one-touch key generated on the image processor 20. Note that the image processing method performed on the image processor 20 side may be performed as an image processing program. Further, the image processing program on the image processor 20 side may be stored on a recording medium readable by a computer. Thereby, it is possible to realize the aforementioned functions as an image processor connected with a network, by reading and executing the image processing program from the recording medium in the computer at any desired time.

Figure 9:
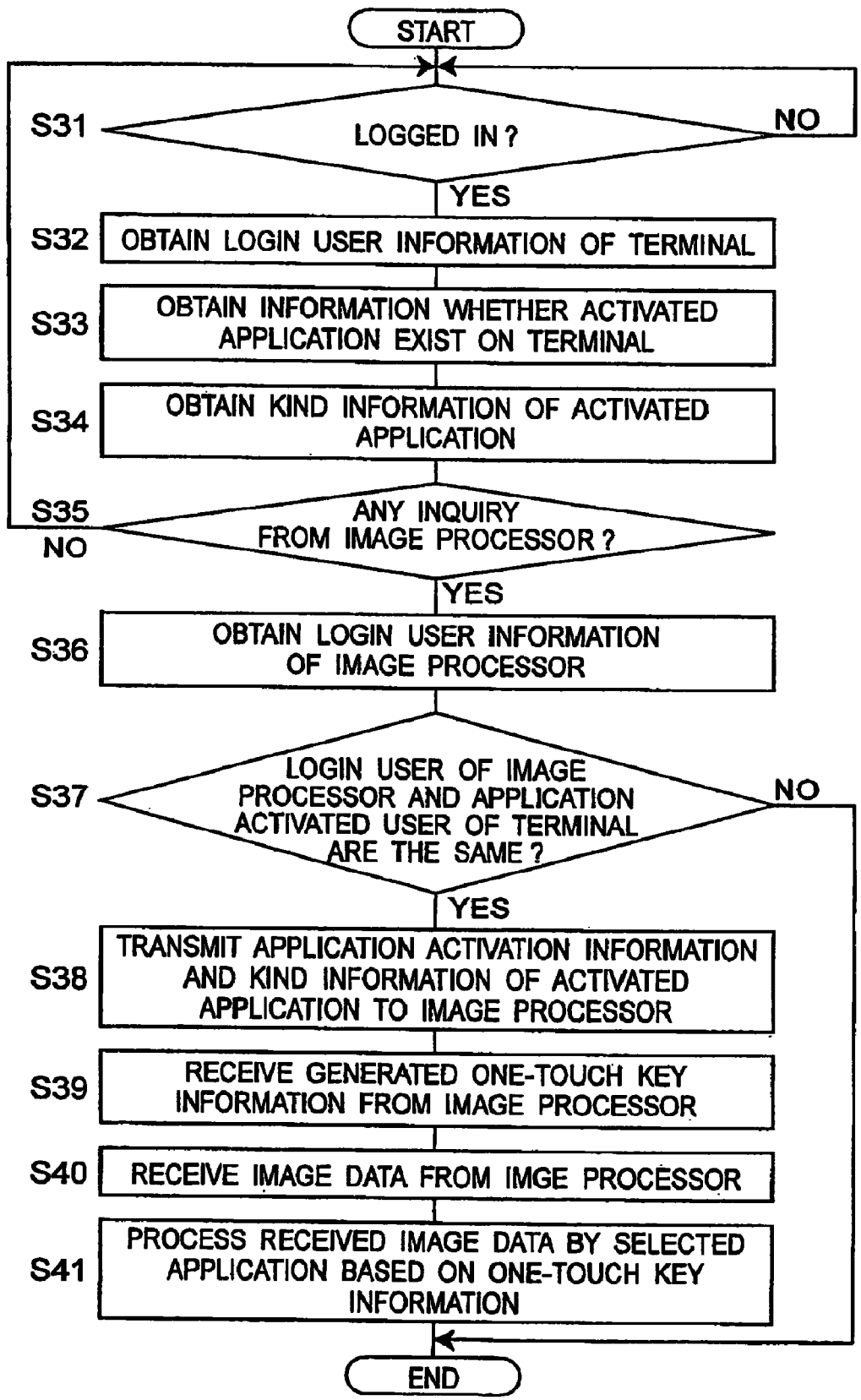
FIG. 9 is a flowchart showing a method for executing a one-touch key function by a resident application on the user terminal.

FIG. 9 is a flowchart showing the image processing method for processing image data received from the image processor 20, on the user terminal 50 side by the selected application in accordance with the information of the one-touch key generated on the image processor 20.

(a) The user terminal 50 checks whether a user logged in to the user terminal 50 or not (S31). If no user logged in, the user terminal 50 repeats the same step S31.

(b) The user terminal 50 obtains information about the login user of the user terminal 50 (S32). If plural users use the terminal 50, one user is specified by the login user information.

(c) The user terminal 50 obtains information about whether or not any application is activated on the user terminal 50 (S33).

(d) The user terminal 50 obtains the kind information about the application activated on the user terminal 50 (S34).

(e) The user terminal 50 checks whether it received an inquiry from the image processor 20 (S35). If no inquiry has been received, it goes back to step S31.

(f) The user terminal 50 obtains login user information of the image processor 20 (S36).

(g) The user terminal 50 determines whether or not the login user of the image processor 20 and the application activation user of the user terminal 50, that is, the login user of the user terminal 50, are the same (S37). The determination of the user identity is performed by comparing respective pieces of login user information. If the pieces of information coincide with each other, the users are determined as identical, then moves to step S38, and if they do not coincide with each other, the users are determined as different, and the processing ends (END).

(h) The user terminal 50 transmits activation information of the application and the kind information of the activated application to the image processor 20 (S38).

(i) The user terminal 50 receives information about a one-touch key generated, from the image processor 20 (S39).

(j) The user terminal 50 receives image data from the image processor 20 via the communication unit 40 (S40).

(k) In accordance with the information of the one-touch key, the received image data is processed by the selected application (S41). A method for processing image data by operating another application with a resident program, as described above, can be realized by a method described in, for example, Japanese Patent Application Laid-open No. 2004-110842.

Figures 10, 11:
FIG. 10 shows an exemplary e-mail prepared on the user terminal.
FIG. 11 shows an example in which image data received from the image processor is attached to the e-mail prepared on the user terminal.

For example, when an e-mail application is selected, an e-mail to which image data is attached is transmitted by the e-mail application 38 on the user terminal 50, as shown in FIGS. 10 and 11. FIG. 10 is an example of an e-mail prepared on the user terminal 50. FIG. 11 is an example of an e-mail to which image data is attached, the image data having been transmitted from the image processor 20 by a program for performing one-touch key processing on the user terminal 50 (image processing program on the user terminal 50 side) based on the information of the one-touch key generated on the image processor 20. After the image data transmitted from the image processor 20 being attached automatically to the e-mail, the e-mail may be transmitted to the destination automatically, or may be transmitted according to an transmission instruction of the user. Although an example in which the destination, subject and text of the e-mail have been prepared on the user terminal 50 side is shown here, the present invention is not limited to this configuration. The destination, subject and text of the e-mail may be prepared or added by remotely operating the e-mail application 38 activated on the user terminal 50 from the image processor 20.

On the other hand, if the document preparation application 39 is selected, a document including image data is prepared by the document preparation application 39 on the user terminal 50. In this case, the format (frame, forms, size, paragraphs, layout, etc.) or the like of the document may be prepared beforehand on the user terminal 50 and then the document including image data is prepared. Alternatively, the document may be prepared by setting the format or the like of the document, by remotely operating the document preparation application 39 activated on the user terminal 50 from the image processor 20. Further, the image data may be loaded as a document by performing a character recognition with an OCR or the like, for example.

As described above, it is possible to process, on the user terminal 50 side, image data received from the image processor 20 in association with an application selected from the applications activated on the user terminal 50, in accordance with information of the one-touch key generated on the image processor 20. Note that in the image processing method performed on the user terminal 50 side, it is preferable that the image processing program be executed as a resident program on the user terminal 50. However, the image processing program is not limited to the example of the resident program. It may be activated on the user terminal 50 from the image processor 20 as needed. Further, the image processing program on the user terminal may be stored on a recording medium readable by a computer. Thereby, it is possible to realize the aforementioned functions as the user terminal 50 connected with a network, by reading and executing the image processing program from the recording medium in the computer as desired.

INDUSTRIAL AVAILABILITY

The present invention can apply to, an image processing system in which an image processor and user terminals are connected over a network, an image processor, and an image processing program.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An image processing system, comprising:
a multi function peripheral, and
a user terminal connected with the multi function peripheral over a network,
wherein the multi function peripheral comprises:
a user authentication unit for authenticating a login user of the multifunction peripheral;
a user terminal searching unit for searching a user terminal that is logged in by the same user as the login user of the multi function peripheral authenticated by the user authentication unit;
an activated application identifying unit for obtaining information about an application activated on the user terminal that is searched by the user terminal searching unit;
a one-touch key generating unit for generating a one-touch key including information for processing image data by the application activated on the user terminal that is searched by the user terminal searching unit; and
a transmission unit for transmitting the image data to the user terminal, and
the user terminal comprises:
a receiving unit for receiving the image data from the multi function peripheral; and
a one-touch key processing unit for processing the image data by the application activated on the user terminal based on the information of the one-touch key.

2. A multi function peripheral connected with a user terminal over a network, comprising:
a user authentication unit for authenticating a login user of the multifunction peripheral;
a user terminal searching unit for searching a user terminal that is logged in by the same user as the login user of the multi function peripheral authenticated by the user authentication unit;
an activated application identifying unit for obtaining information about an application activated on the user terminal that is searched by the user terminal searching unit;
a one-touch key generating unit for generating a one-touch key including information for processing image data by the application activated on the user terminal that is searched by the user terminal searching unit; and
a transmission unit for transmitting the image data to the user terminal.

3. The multi function peripheral according to claim 2, further comprising a scanner unit for scanning a copy to create the image data, wherein the multi function peripheral transmits the image data to the user terminal.

4. The multi function peripheral according to claim 2, wherein the transmission unit transmits to the user terminal in accordance with the selected one-touch key.

5. The multi function peripheral according to claim 2, further comprising an acceptor for accepting a selection of at least one application from a plurality of applications activated on the user terminal.

6. The multi function peripheral according to claim 2, wherein the one-touch key formed by the one-touch key generating unit is displayed in preference to predetermined one-touch key provided in the multi function peripheral.

7. The multi function peripheral according to claim 2, further comprising image processing unit for generating the image data.

8. An image processing method in a user terminal connected with a multi function peripheral over a network, the multi function peripheral being configured to allow a user to process image data on multi function peripheral side in association with an application activated on the user terminal, the method comprising:
obtaining information about a login user of the user terminal;
obtaining information about whether or not an application is activated on the user terminal, and kind information of the application;
transmitting, to the multi function peripheral activation information of the application and the kind information of the application activated,
obtaining information about a login user of the multi function peripheral; and
determining an identity of the login user of the multi function peripheral and the login user of the user terminal;
receiving the image data from the multi function peripheral;
receiving, from the multi function peripheral, information of a one-touch key including information for processing the image data by an application activated on the user terminal; and
processing the image data by the application activated on the user terminal based on the information of the one-touch key.

9. A non-transitory recording medium, readable by a computer, which stores an image processing program for causing a computer to execute the image processing method according to claim 8.

10. The image processing system according to claim 1, wherein the application activated on the user terminal is an e-mail application, and the multi function peripheral is configured to allow the user to add text to an e-mail using the e-mail application activated on the user terminal from the multi function peripheral.

11. The multi function peripheral according to claim 2, wherein the multi function peripheral is configured to allow a user to process the image data on multi function peripheral side in association with the application activated on the user terminal.

12. An image processing system comprising:
a multi function peripheral configured to perform two or more functions including a scanning function to obtain image data and a printing function to print data, and
a user terminal connected with the multi function peripheral over a network,
wherein the multi function peripheral comprises:
a user authentication unit for authenticating a login user and provided at the multi function peripheral;

a software identifying unit for obtaining information about a software on the user terminal that is searched by the user terminal searching unit;

a user terminal searching unit for searching a user terminal that is logged in by the same user as the login user authenticated by the user authentication unit;

a one-touch key generating unit for generating a one-touch key including information for processing the image data by the software on the user terminal that is searched by the user terminal searching unit; and a transmission unit for transmitting the image data to the user terminal, and the user terminal comprises:

a receiving unit for receiving the image data from the multi function peripheral; and a one-touch key processing unit for processing the image data by the software on the user terminal based on the information of the one-touch key.

13. A multi function peripheral configured to perform two or more functions including a scanning function to obtain image data and a printing function to print data, and connected with a user terminal over a network, comprising:

a user authentication unit for authenticating a login user;

a user terminal searching unit for searching a user terminal that is logged in by the same user as the login user authenticated by the user authentication unit;

a software identifying unit for obtaining information about a software on the user terminal that is searched by the user terminal searching unit;

an one-touch key generating unit for generating a one-touch key including information for processing the image data by the software on the user terminal that is searched by the user terminal searching unit; and a transmission unit for transmitting the image data to the user terminal.

14. The multi function peripheral according to claim 13, wherein the one-touch key formed by the one-touch key generating unit is displayed in preference to predetermined one-touch key provided in the multi function peripheral.

* * * * *